July 13, 1954 B. F. COLEMAN ET AL 2,683,606
GEAR HOLDING CHUCK
Filed Dec. 30, 1950 2 Sheets-Sheet 1
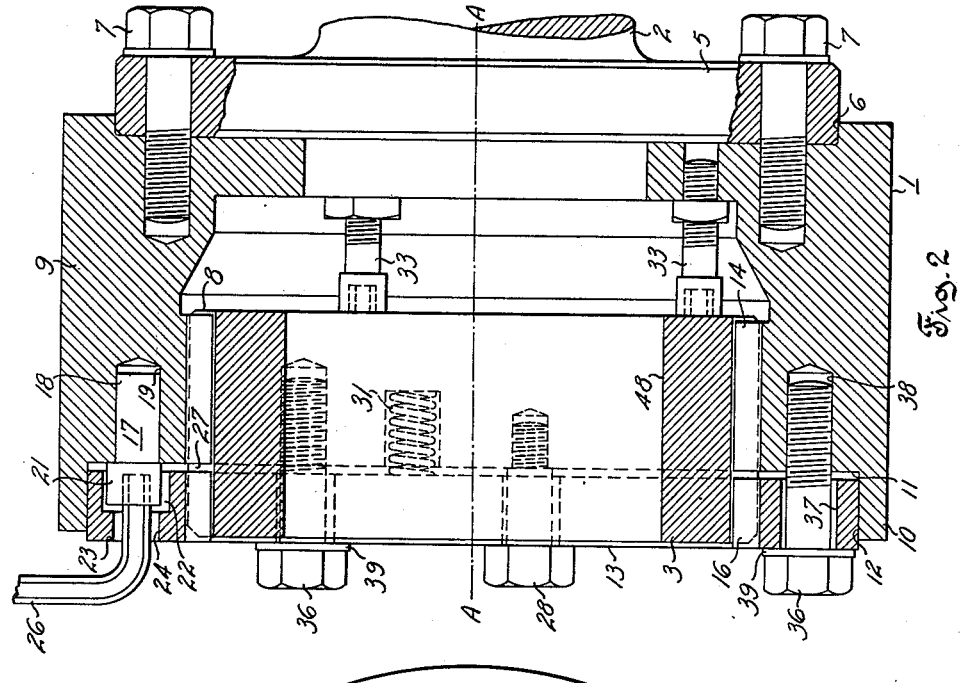
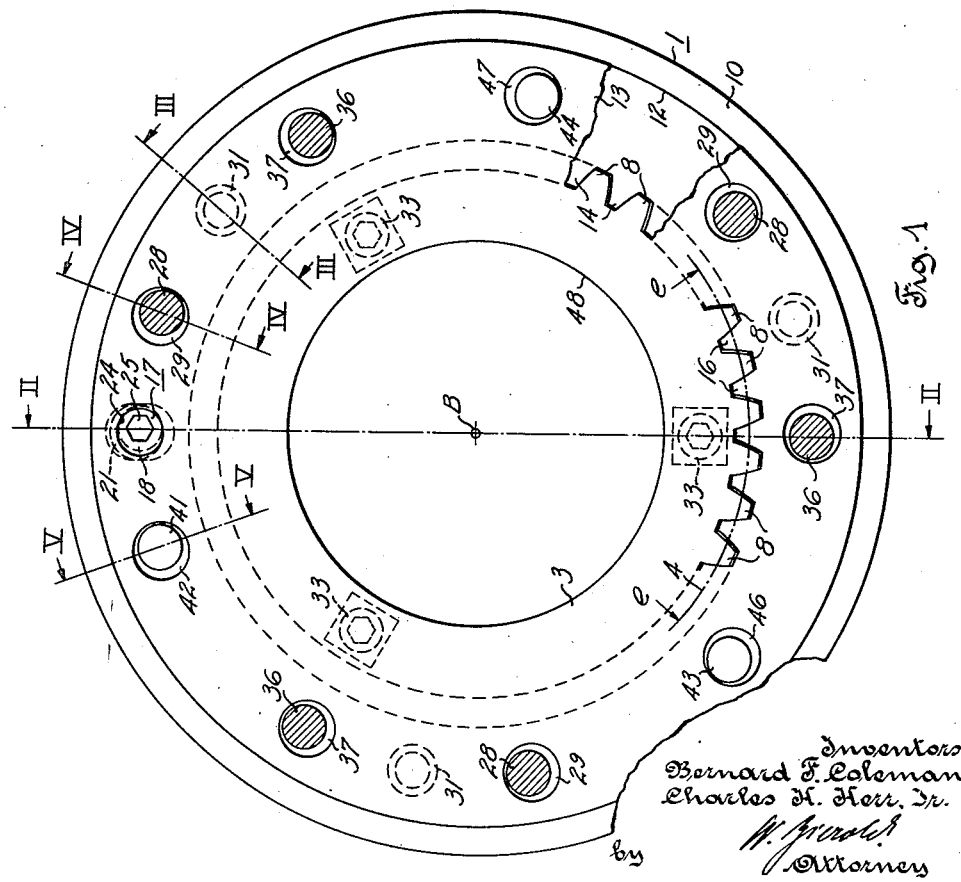
Inventors
Bernard F. Coleman
Charles H. Herr, Jr.
by
Attorney Patented July 13, 1954

2,683,606

UNITED STATES PATENT OFFICE 2,683,606

GEAR HOLDING CHUCK

Bernard F. Coleman and Charles H. Herr, Jr., Springfield, Ill., assignors to Allis-Chalmers Manufacturing Company, Milwaukee, Wis.

Application December 30, 1950, Serial No. 203,713

13 Claims. (Cl. 279—1)

The invention relates to work holders by means of which a workpiece may be mounted on the head stock of a lathe or the like for rotation in unison therewith.

More particularly, the invention is concerned with a chuck by means of which a gear wheel may be rotated on its axis for the performance of a finishing operation after the gear teeth have been cut.

It is usual in the manufacture of gears for change speed transmissions and the like, to harden the gears after the teeth have been cut, and certain types of gear holding chucks have heretofore been suggested in an attempt to take care of slight distortions of the gear which may have been caused by the hardening operation and which make it difficult to precisely center the hardened gear for rotation on the center of its pitch circle. According to some of such earlier suggestions, a rotary gear supporting structure is provided with radial chucking teeth which are circumferentially spaced from each other and so arranged that the teeth of the hardened gear can be telescoped into and out of the spaces between the chucking teeth by axial movement of the gear in one direction or the other relative to the gear supporting structure. A gear locking structure is rotatably mounted on the gear supporting structure and has radial chucking teeth which, like the chucking teeth of the gear supporting structure, are circumferentially spaced from each other and so arranged that the teeth of the hardened gear may be telescoped into and out of the spaces between chucking teeth of the locking structure by axial movement of the gear in one direction or the other relative to the locking structure. Preparatory to loading of the chuck, the locking structure is rotated relative to the supporting structure into a position in which it does not obstruct telescopic movement of the teeth of the hardened gear into the spaces between the chucking teeth of the supporting structure. After the gear has been moved axially to a position in which its teeth axially overlap the chucking teeth of the supporting structure, the locking structure is turned from its nonobstructing position to a position in which its chucking teeth contact the teeth of the hardened gear and exert a clamping pressure thereon which retains the gear in axially fixed relation to the chuck. Various forms of gear chucks of the hereinabove outlined character are disclosed, for instance, in U. S. Patent 1,110,396, dated September 15, 1914, and granted to C. J. Marks, and in British Patent 464,875, dated January 8, 1937, and granted to James Wakefield.

Generally, it is an object of the invention to provide an improved gear holding chuck of the hereinabove outlined character, and one which will greatly expedite and facilitate the chuck loading and chuck unloading operations.

More specifically, it is an object of the invention to provide a gear holding chuck of the hereinabove outlined character incorporating an improved mechanism for rotating the gear locking structure relative to the gear supporting structure between chuck loading and gear clamping positions, and for releasably securing the gear locking structure in its gear clamping position on the gear supporting structure.

Another object of the invention is to provide a gear holding chuck of the hereinabove outlined character incorporating an improved mounting of the gear locking structure on the gear supporting structure, which will permit ready cleansing of the chuck when it is used for the performance of a grinding operation on the hardened gear, the improved mounting being such that loose abrasive and abraded matter which may have become lodged between relatively movable parts of the chuck may readily be flushed out by water or other liquid which is used in the grinding operation, and so that such flushing can be efficiently accomplished without dismantling the chuck.

A further object of the invention is to provide a gear holding chuck incorporating the hereinabove outlined features of improvement and which is relatively simple and compact, efficient in operation, and which may be manufactured at relatively low costs.

These and other objects and advantages are attained by the present invention, various novel features of which will be apparent from the description herein and the accompanying drawings, disclosing an embodiment of the invention, and will be more particularly pointed out in the appended claims.

Referring to the drawings:

Fig. 1 is an elevational end view of a chuck for holding an externally toothed gear;

Fig. 2 is a sectional view on line II—II of Fig. 1 and showing part of a rotary spindle having a mounting head for the chuck;

Figure 3:
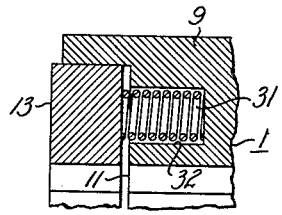
Fig. 3 is a partial section on line III—III of Fig. 1.

In the assembly of parts as shown in Figs. 1 and 2, a heavy, annular gear supporting structure 1 is mounted on a horizontal, rotary spindle 2 for rotation in unison therewith on the axis of the latter which is indicated by the dash-dotted line A—A in Fig. 2, and an externally toothed gear 3 is mounted within the gear supporting structure 1 in a manner more fully explained hereinbelow, so that the center B (Fig. 1) of the pitch circle 4 of the gear 3 accurately coincides with the axis A—A. The spindle 2 has a disk head 5 on which the gear supporting structure 1 is accurately centered by means of a pilot shoulder 6, and the gear supporting structure is drawn up against the disk head 5 by means of an annular series of cap screws 7, so that when the spindle 2 rotates the supporting structure 1 will run true with respect to the axis A—A.

Figure 7:
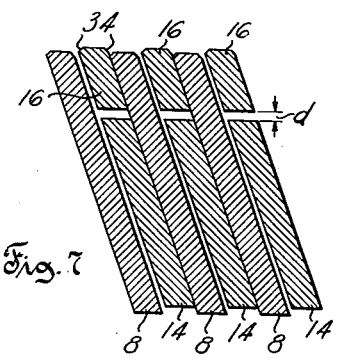
Fig. 7 is a diagrammatic view of teeth formed on chuck parts and on a gear part shown in Figs. 1 and 2.
Figure 9:
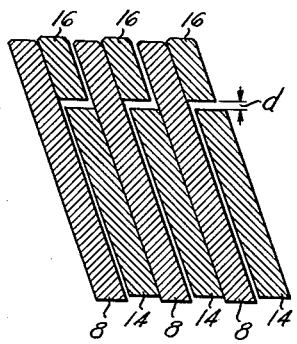
Fig. 9 is a view similar to Fig. 7 but showing the teeth of the chuck parts in a relative position different from that in which they are shown in Fig. 7.

The external teeth of the gear 3 are designated in Figs. 1, 7 and 9 by the reference character 8. From Figs. 7 and 9, which are developed views taken in the direction of arrows e—e in Fig. 1 on the pitch circle 4 of the gear 3, it will be noted that, in the present instance, the gear 3 is a spiral gear, the teeth 8 being of involute shape and cut on a helix in conformity with established practice.

Referring to Fig. 2, the supporting structure 1, has an annular wall part 9 of relatively large radial width, which extends axially over the gear 3 at the outer periphery of the latter, and an annular lip 10 extends forwardly in axial direction from a radial surface 11 of the annular wall part 9 at the forward end of the latter. The annular lip 10 has a cylindrical inner surface 12, and mounted in the annular space between the gear 3 and the cylindrical inner surface 12 of the lip 10 is a gear locking structure 13 in the form of an annular plate whose axial thickness corresponds substantially to the axial length of the lip 10. The locking plate 13 has a cylindrical surface at its outer periphery which is of slightly smaller diameter than the cylindrical inner surface 12 of the lip 10, and cooperative engagement of the cylindrical outer surface of the plate 13 with the cylindrical inner surface 12 of the lip 10 connects the rotary gear supporting structure 1 and the gear locking structure 13 with each other for back and forth adjustment of the locking structure relative to the supporting structure rotatively on and longitudinally of the axis of rotation of the gear supporting structure 1.

In Fig. 1, part of the locking plate 13 is cut away to expose involute gear chucking teeth 14 which are formed at the inner periphery of the annular wall part 9 of the supporting structure 1. While only a few teeth 14 are shown in Fig. 1, it should be understood that the wall part 9 is toothed all around its inner periphery, and that the internal teeth 14 are cut on the same helix and on the same pitch circle as the gear teeth 8. However, the radial height and peripheral width of each of the teeth 14 are such as to afford a slight circumferential and radial clearance relation between the gear teeth 8 and the chucking teeth 14, which may be in the order of a few thousandths of an inch and just sufficient to permit axial movement of the gear into and out of the supporting structure without binding and irrespective of any slight distortions of the gear which may have been caused by its hardening. In Figs. 1, 7 and 9 the clearance relation between the gear teeth 8 and the chucking teeth 14 is shown greatly exaggerated for purposes of clarification.

Another annular series of involute gear chucking teeth 16 are formed on the inner periphery of the locking plate 13, the teeth 16, like the chucking teeth 14, being cut on the same helix as the gear teeth 8, their pitch circle being of the same diameter as the pitch circle diameter of the gear teeth 8 and of the chucking teeth 14. The radial height and the peripheral width of the chucking teeth 16 are the same as the radial height and peripheral width of the chucking teeth 14, and the locking plate 13, like the circumferential wall portion 9 of the gear supporting structure 1 is toothed all around its inner periphery.

In Fig. 1 the gear locking plate 13 is shown in a rotatively adjusted position relative to the gear supporting structure, which causes the chucking teeth 16 to bear circumferentially in anticlockwise direction, as viewed in Fig. 1, against the gear teeth 8, as indicated in the lower part of Fig. 1, while the gear teeth 8, in turn bear circumferentially in anticlockwise direction against the chucking teeth 14, as indicated in Fig. 1 between the break lines of the locking plate 13. The rotatively adjusted position in which the locking plate 13 is shown in Fig. 1 will be referred to as its gear clamping position, and it will be understood, that the coaction of the chucking teeth 14 and 16 with the gear teeth 8 eliminates all radial and circumferential play of the gear 3 relative to the gear supporting structure 1 and positions the gear 3 with respect to the gear supporting structure 1 so that the center B of the gear pitch circle 4 accurately coincides with the axis of rotation of the gear supporting structure which is indicated by the line A—A.

A slight clockwise turn of the gear locking plate 13, as viewed in Fig. 1, from its gear clamping position, establishes a circumferential and radial clearance relation of the gear teeth 8 with respect to chucking teeth 14 and 16, and the rotatively adjusted position of the locking plate 13 which affords this clearance relation will be referred to as the chuck loading position of the locking plate.

In order to provide for convenient rotation of the locking plate 13 from its chuck loading to its gear clamping position, and vice versa, and to exert considerable anticlockwise torque, as viewed in Fig. 1, upon the locking plate 13, the chuck is equipped with an adjusting mechanism which is constructed as follows: An eccentric, generally designated by the reference character 17, has a cylindrical shank portion 18 (Fig. 2) by means of which it is mounted on the gear supporting structure 1 for back and forth rotation on an axis extending parallel to and spaced from the axis A—A. A cylindrical bore 19 for the reception of the shank 18 extends from the surface 11 of the wall portion 9 into the latter.

and the shank 18 has a close rotary and axial sliding fit within the bore 19. The head of the eccentric is formed by a cylindrical part 21 of larger diameter than the shank 18 and which is integrally connected with the latter, the axis of the cylindrical head 21 extending parallel to and being spaced radially from the axis of the shank 18.

Figure 6:
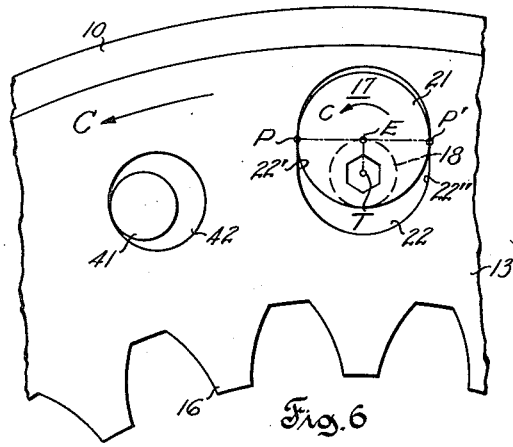
Fig. 6 is an enlarged, schematic view of an adjusting mechanism forming part of the gear chuck shown in Figs. 1 and 2.
Figure 8:
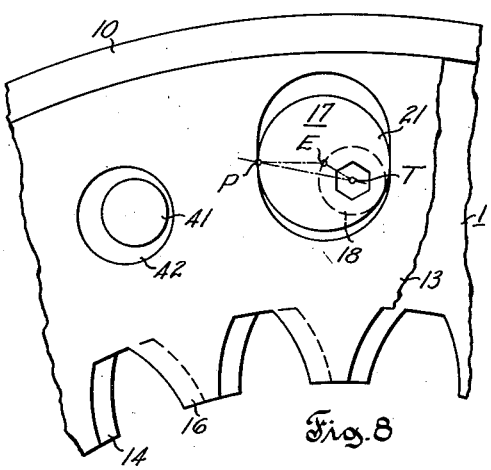
Fig. 8 is a schematic view similar to Fig. 6 but showing the adjusting mechanism in a condition different from that in which it is shown in Fig. 6.

The throw of the eccentric, that is, the radial spacing between the axes of the shank 18 and the eccentric head 21 is relatively short and shown greatly exaggerated in Figs. 6 and 8. In these figures, the turning center of the shank 18 on the gear supporting structure 1 is designated by the reference character T, and the center of the eccentric head 21 by the reference character E. The reference character P in Fig. 6 designates the point at which torque in the direction of arrow C is transmitted to the locking plate 13 when, in the position of the parts as shown in Fig. 6, a torque in the direction of arrow c is applied to the eccentric 17.

As best shown in Fig. 2, the eccentric head 21 projects into an aperture 22 which is formed in the locking plate 13 at the side of the latter which faces the radial surface 11 of the gear supporting structure 1. From Figs. 6 and 8 it will be noted that the aperture 22 is elongated radially of the locking plate 13 and that it has straight opposite side wall portions 22' and 22" which are relatively short and extend parallel to each other to define a radial slot in the locking plate 13 for the reception of the eccentric head 21. The reference character P' in Fig. 6 designates a point diametrically opposite to the point P, at which torque in a direction opposite to arrow C will be transmitted to the locking plate when, in the position of the parts as shown in Fig. 6, a torque in a direction opposite to arrow c is applied to the eccentric 17. The parallel wall portions 22' and 22" of the aperture 22 provide torque transmitting abutments which are formed on and spaced from each other circumferentially of the gear locking structure 13 for cooperative engagement with the eccentric 17 at diametrically opposite portions, respectively, of the latter.

The radially elongated aperture 22 for the eccentric head 21 does not extend clear through the locking plate 13 but is partially covered, at the axially outer side of the plate 13 by a radial inwardly projecting flange 23 which serves as an axial stop for the eccentric 17 and defines a circular hole 24 (Fig. 1) in the axially outer side of the plate 13. The eccentric head 21 has an hexagonal socket 25 for the reception of an Allen set screw wrench 26 (Fig. 2), and the hole 24 permits insertion of the wrench into and withdrawal of the wrench from the socket 25. It should be noted that the diameter of the hole 24 is larger than the maximum diametrical width of the wrench 26 which is necessary in order to permit unobstructed rotary back and forth adjustment of the plate 13 relative to the gear supporting structure by means of the wrench, as will appear more fully hereinbelow.

Figure 4:
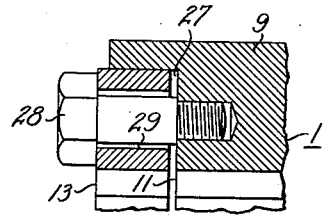
Fig. 4 is a partial section on line IV—IV of Fig. 1.

As has been pointed out hereinbefore, the cylindrical surface at the outer periphery of the locking plate 13 has a rotary and axial sliding fit on the cylindrical inner surface 12 of the lip 10 of the supporting structure 1. In the position of the parts as shown in Figs. 2 to 5, the locking plate 13 is spaced from the radial end surface 11 of the supporting structure 1, by an axial gap 27. The width of the gap 27, axially of the chuck, which is indicated in Figs. 4, 7 and 9 by the reference character $d$, is determined by axial engagement of the axially outer side of the locking plate 13 with the heads of three shoulder bolts 28, one of which is shown in each of Figs. 2 and 4, and all three of which are indicated in Fig. 1, but the heads of the bolts 28 are omitted in Fig. 1 for purposes of exposure. The shoulder bolt 28 shown in Figs. 2 and 4 has a threaded end portion which is screwed into a tapped hole of the annular wall part 9 of the gear supporting structure 1. The shank part of the bolt 28, which extends between the radial end surface 11 of the gear supporting structure and the hexagonal head of the bolt, forms a cylindrical shoulder of greater diameter than the threaded end portion of the bolt, and whose axial length is equal to the axial thickness of the plate 13 plus the axial width $d$ of the gap 27. The shoulder part of the bolt 28 extends through a cylindrical hole 29 of the plate 13 which is radially enlarged relative to the bolt, as best shown in Fig. 1, so as to permit unobstructed back and forth rotation of the plate 13 between chuck loading and gear clamping positions, as will appear more fully hereinbelow. As shown in Fig. 1, the three bolts 28 are equally spaced on a circle concentric with the axis A—A, and the plate 13 has three holes 29 which are equally spaced on the same circle as the bolts 28, and respectively accommodate the shoulders of the bolts 28 in the manner explained hereinbefore. The bolts 28 represent axial thrust transmitting abutment means formed on the gear supporting structure 1 in axially engageable relation to the gear locking structure 13 so as to limit axial movement of said gear locking structure in a direction away from said supporting structure.

Axial movement of the locking plate 13 from the position in which it is shown in Fig. 2 toward the end surface 11 of the gear supporting structure 1 is yieldingly opposed by three coil springs 31 which are mounted at equal circumferential spacings on the gear supporting structure 1. Referring to Fig. 3, the coil spring 31 shown in this figure bears axially at one of its ends upon the closed end of a bore 32 which extends from the radial end surface 11 of the gear supporting structure into the annular wall portion 9 of the latter in a direction parallel to the axis A—A, and the other end of the coil spring 31 bears axially upon the side surface of the plate 13 which faces the radial end surface 11 of the supporting structure. Fig. 3 is illustrative of the mounting of each of the three coil springs 31, and the coil springs exert a permanent axial pressure upon the locking plate 13 which tends to move the latter away from the radial end surface 11 of the supporting structure 1. However, axial movement of the plate 13 due to the pressure of the coil springs 31 is limited by the shoulder bolts 28 as has been explained hereinbefore. It will be noted that the coil springs 31 are socketed in the gear supporting structure 1 and that the plate 13, while subject to axial pressure by the coil springs, may be rotated back and forth between chuck loading and gear clamping positions.

As shown in Figs. 1 and 2, the supporting structure 1 has a radial inwardly extending flange at the forward side of the disk head 5, and mounted on said flange are three axially extending studs 33 which serve as abutments for limiting movement of the gear 3 toward the disk head 5. The gear 3 has a plane radial end surface which bears axially against the heads of the studs 33, and in order to insure accurate positioning of the end face of the gear 3 at exactly right angles to the axis A—A the forward end faces of the studs are preferably finished after the studs have been installed on the supporting structure. Prior to insertion of the gear 3 into the chuck, a grinding wheel, not shown, may be advanced against the studs 33 while the supporting structure 1 is rotated on the axis A—A by the spindle 2, and the forward end surfaces of the studs may thus be ground so as to extend in a radial plane at exactly right angles to the axis A—A.

The assembled unit comprising the supporting structure 1, the locking plate 13, the eccentric 17, the shoulder bolts 28, the studs 33, and the coil springs 31 permits operation as follows. Preparatory to axial insertion of the gear into the unit, the eccentric 17 is rotated by means of the wrench 26 to the position in which it is shown in Fig. 6 and in which the center E of the eccentric head 21 is positioned on a radius from the axis A—A through the turning center T of the eccentric on the supporting structure 1. Adjustment of the eccentric 17 to the position in which it is shown in Fig. 6 places the locking plate 13 into its chuck loading position, that is, into a rotatively adjusted position relative to the supporting structure 1, in which the chucking teeth 16 of the locking plate 13 are spirally aligned, respectively, with the chucking teeth 14 of the supporting structure 1, as indicated in Fig. 7. The chucking teeth 16 have suitably chamfered edges 34 (Fig. 7) at the axially outer side of the locking plate 13 to facilitate entry of the gear teeth 8 into the spaces between the teeth 16. After initial axial movement of the gear 3 into the locking plate 13, the gear will be guided by the teeth 16 for continued spiral movement into the supporting structure 1. During such spiral movement of the gear 3 the leading ends of the gear teeth 8 will pass through the gap 27 and into the spaces between the chucking teeth 14 without liability of clashing against the end edges of the teeth 14 at the radial surface 11 of the supporting structure. The spiral alignment of the chucking teeth 16 with the chucking teeth 14, as shown in Fig. 7, enables the gear teeth 8 to bear simultaneously against the chucking teeth 14 and 16 in either clockwise or anticlockwise direction, Fig. 7 illustrating a position of the gear 3 in which its teeth 8 simultaneously bear against the chucking teeth 14 and 16 in anticlockwise direction.

After the gear 3 has been moved into the chuck to the position illustrated by Figs. 2 and 7, the eccentric 17 is turned by means of the wrench 26 in the direction of arrow c in Fig. 6. As a result of such rotation of the eccentric 17, the gear locking plate 13 is rotated to its gear clamping position which is illustrated in Fig. 1 and also, somewhat schematically, in Figs. 8 and 9. Comparing Fig. 9 with Fig. 7 it will be noted that in Fig. 9 the left sides of the gear teeth 8 bear against the right sides of the chucking teeth 14 the same as in Fig. 7, but that the chucking teeth 16 are no longer spirally aligned with the chucking teeth 14. The spiral misalignment of the chucking teeth 16 relative to the chucking teeth 14 as shown in Fig. 9 is very small but effective to place the left sides of the chucking teeth 16 into engagement with the right sides of the gear teeth 8, while the left sides of the gear teeth 8 bear against the right sides of the chucking teeth 14. Under these conditions, the gear 3 can rotate neither clockwise nor anticlockwise relative to the supporting structure 1, provided that the locking plate 13 is prevented from rotating out of its gear clamping position.

Fig. 8 illustrates the approximate position to which the eccentric 17 must be adjusted in order to bring the left sides of the chucking teeth 16 firmly into engagement with the right sides of the gear teeth 8, while the left sides of the latter bear against the right sides of the chucking teeth 14 as shown in Fig. 9. It will be noted that in Fig. 8 the eccentric 17 occupies a position in which the center E of its head 21 is almost on dead center between the points T and P, and under these conditions the manual torque which must be applied to the eccentric 17 by the wrench 26 in order to firmly clamp the gear teeth 8 between the chucking teeth 14 and 16 will be relatively small.

Due to the helical slant of the gear teeth 8 and of the chucking teeth 14 and 16, application of torque to the locking plate 13 in gear clamping direction will subject the gear 3 to a tendency to slide back into the supporting structure 1, that is, toward the disk head 5. Such backward sliding movement of the gear, however, will be prevented by engagement of the gear with the studs 33. On the other hand, application of torque to the locking plate 13 in gear clamping direction and the resulting thrust reaction between the helical gear teeth 8 and the chucking teeth 16, will subject the plate 13 to a tendency to back away from the gear, that is, to slide on the gear supporting structure toward the left in Fig. 2. However, since the axially outer side of the plate 13 is permanently urged into engagement with the heads of the bolts 28 by the coil springs 31, it will not be possible for the plate 13 to back away from the gear 3 when torque is applied to the plate in gear clamping direction.

Under certain conditions, that is, if the helix angle of the gear teeth 8 and of the chucking teeth 14 and 16 is relatively large, no provisions other than the eccentric 17 and the shoulder bolts 28 may be necessary in order to retain the locking plate 13 in the gear clamping position in which it is shown in Figs. 1 and 8, friction between the plate 13 and the eccentric head 21 and friction between the plate 13 and the heads of the bolts 28 being sufficient to hold the plate 13 in its gear clamping position. On the other hand, if the helix angle of the gear teeth 8 and of the chucking teeth 14 and 16 is relatively small, it may be desirable or necessary to make additional provisions for securing the locking plate against rotation from its gear clamping to its chuck loading position. The chuck shown in Figs. 1 and 2 incorporates such provisions and to that end is equipped with three cap screws 36, two of which are shown in Fig. 2, and all three of which are shown in section in Fig. 1.

The cap screw 36 shown at the lower left hand corner of Fig. 2, has a hexagonal head at the axially outer side of the locking plate 13, and a relatively long shank which extends through an unthreaded hole 37 of the plate 13 and is screwed into a tapped hole 38 of the annular wall 9 of the gear supporting structure 1. A washer 39 is interposed between the head of the cap screw 36 and the axially outer side of the plate 13. The three bolts 36 are equally spaced circumferentially of the gear supporting structure 1, as shown in Fig. 1, and the foregoing explanations with reference to the cap screw 36 at the lower left hand corner of Fig. 2 equally apply to the other two cap screws 36.

Preparatory to insertion of the gear 3 into the chuck, the cap screws 36 are given a few turns so as to move their heads away from the locking plate 13, that is toward the left in Fig. 2. The holes 37 in the plate 13 which accommodate the shanks of the screws 36 are cylindrical but of larger diameters than the screw shanks so that the latter will not interfere with rotary back and forth adjustment of the plate 13 between its chuck loading and gear clamping positions. After the gear 3 has been inserted into the chuck and the plate has been rotated to its gear clamping position as shown in Figs. 1 and 8, the cap screws 36 are drawn up so as to place the plate 13 under axial pressure in the direction toward the disk head 5. The stress conditions which are created by such axial pressure upon the plate 13 will be effective to retain the latter more securely in its gear clamping position, and this stress condition may readily be relieved, preparatory to rotation of the locking plate 13 from its gear clamping to its chuck loading position, by simply giving the cap screws 36 a few turns so as to back their heads away from the locking plate 13. Generally, the cap screws 36 represent adjustable clamping means which are operatively interposed between the gear supporting structure 1 and the gear locking structure 13 and which are selectively operable to apply and release an axial contracting pressure between said supporting and locking structures.

Figure 5:
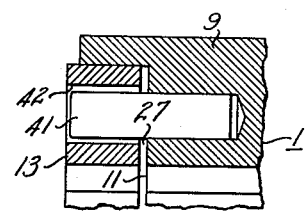
Fig. 5 is a partial section on line V—V of Fig. 1.

With reference to Fig. 6, it has been pointed out hereinbefore that torque in a direction opposite to the arrow C will be transmitted at point P' to the plate 13 when, in the position of the parts as shown in Fig. 6, a torque in a direction opposite to arrow c is applied to the eccentric 17. Provisions are made in the herein disclosed chuck for taking up the torque to which the plate 13 becomes subjected under the mentioned conditions, the object of such provisions being to prevent the plate 13 from overtraveling its chuck loading position upon application of manual torque to the eccentric 17 in the direction opposite to arrow c. To that end, a cylindrical stud 41 is mounted, as best shown in Figs. 5 and 6, on the wall portion 9 of the supporting structure so as to extend forwardly from the radial end surface 11, the stud being press fitted into a blind hole of the wall portion 9. The plate 13 has a cylindrical hole 42 of larger diameter than the diameter of the stud 41, and the hole 42 is so located on the plate 13 that the cylindrical surface of the hole 42 contacts the cylindrical surface of the stud 41 when the plate 13 occupies its chuck loading position, as shown in Fig. 6. The diameter of the hole 42 is sufficiently large to permit rotation of the plate 13 from its chuck loading position to its gear clamping position, and to avoid contact of the cylindrical surface of the hole 42 with the cylindrical surface of the stud 41 when the plate 13 occupies its gear clamping position, as shown in Fig. 8.

As shown in Fig. 1, a second stud 43 is mounted on the supporting structure 1 at a 120 degree circumferential spacing from the stud 41, and a third stud 44 is similarly mounted at a 120 degree circumferential spacing from the stud 43. The studs 43 and 44 project into holes 46 and 47, respectively, of the plate 13, and the explanations hereinbefore with reference to the stud 41 and hole 42 similarly apply to the stud 43 and hole 46, and to the stud 44 and hole 47.

The provision of the studs 41, 43 and 44 and their associated holes 42, 46 and 47 in the plate 13, greatly facilitates rotary adjustment of the plate 13 to its chuck loading position preparatory to the insertion of the gear 3 into the chuck, and preparatory to removal of the gear 3 from the chuck. All the operator has to do in order to adjust the plate 13 exactly to its chuck loading position, is to insert the wrench 26 into the socket 25 of the eccentric 17 and then turn the eccentric in the direction opposite to arrow c in Fig. 6 until such turning is positively resisted by engagement of the walls of the holes 42, 46 and 47 with the studs 41, 43 and 44, respectively. On the other hand, the very small rotary displacement of the plate 13 from its chuck loading to its gear clamping position may conveniently be effected by rotating the eccentric 17 on its axis through an angle which is many times larger than the angle through which the plate 13 is rotated on the axis A—A for adjustment from its chuck loading to its gear clamping position, and vice versa.

Any one of the studs 41, 43 and 44 and its associated hole in the locking plate 13 represent first and second torque transmitting stops which are formed, respectively, on the gear supporting structure 1 and on the gear locking structure 13. These stops are engageable with and disengageable from each other by rotation of the gear locking structure from its gear clamping to its gear loading position, and by rotation of the locking structure from its chuck loading to its gear clamping position, respectively.

After the gear 3 has been mounted within the chuck in the manner described hereinbefore so that the center of its pitch circle B (Fig. 1) accurately coincides with the axis A—A (Fig. 2), the center bore 48 of the gear may be finished by means of a grinding wheel, not shown, in conventional manner while the chuck and gear are rotated on the axis A—A by the spindle 2. It is usual in the performance of such grinding operation to feed a liquid, such as water, to the surface being worked on by the grinding wheel. After the gear has been finished and removed from the chuck, the operator may direct such liquid to the gap 27 between the plate 13 and the end surface 11 of the supporting structure 1 in order to wash out any abraded or abrasive material which may have become lodged in the gap. Periodic cleansing of the chuck in the described manner will prevent undue friction and wear between the relatively rotatable parts of the chuck, particularly between the end surface 11 of the supporting structure and the side surface of the plate 13 confronting the end surface 11.

Figure 11:
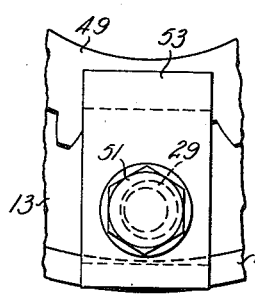
Figs. 10 and 11 are an elevational side view and an elevational end view, respectively, of an auxiliary clamp attached to part of the chuck shown in Figs. 1 and 2.
Figure 10:
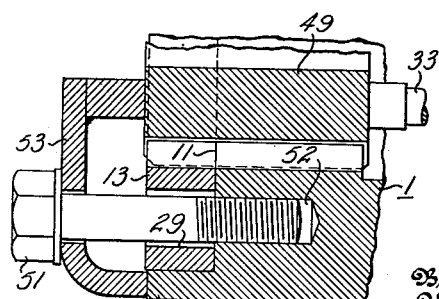

Figs. 10 and 11 show a clamp for use in connection with a chuck of the general type shown in Figs. 1 and 2, but in which the chucking teeth 14 and 16 are straight rather than spiral as explained hereinbefore with reference to Figs. 7 and 9. Figs. 10 and 11 show part of a straight toothed spur gear 49 which, like the gear 3 in Fig. 2, has a plane radial end surface in axial thrust transmitting engagement with the bottom studs 33 of the supporting structure 1. In lieu of the shoulder bolt 28 shown in Fig. 4, Fig. 10 shows a long cap screw 51 which extends through the hole 29 of the locking plate 13 and which is screwed into a tapped hole 52 of the supporting structure. A U-clamp 53 is operatively interposed between the head of the cap screw 51, the annular lip 10 and a radial end surface of the gear 49 at the axially outer side of the latter. The shank of the bolt 51 extends through an aperture of the clamp 53, and when the bolt 51 is drawn up, the straight tooth gear 49 will be firmly pressed axially against the bottom studs 33 of the supporting structure 1. Fig. 10 shows the plate 13 in axial engagement with the radial end surface 11 of the supporting structure, as distinguished from Figs. 3, 4 and 5, which show a gap 27 between the plate 13 and the end surface 11 of the supporting structure. Since the teeth of the gear 49, and the chucking teeth on the gear supporting structure 1 and on the locking plate 13 are straight in this instance, as has been pointed out hereinbefore, the plate 13 will be forced into the position in which it is shown in Fig. 10, when the cap screws 36 in Fig. 2 are drawn up in order to lock the plate 13 in its gear clamping position. Three clamps of the type shown in Figs. 10 and 11 are preferably employed, in order to press a straight tooth gear firmly against the bottom studs 33, the clamps being installed in the locations at which the shoulder bolts 28 are shown in Fig. 1, and the shoulder bolts being omitted when the supporting structure and locking plate are equipped with straight chucking teeth.

The cap screw 51 in Figs. 10 and 11 represents a bolt element which has a head portion at the axially outer side of the gear locking structure 13 and a shank portion extending through an oversize hole in said locking structure and into threaded engagement with the supporting structure 1. The U-clamp 53 represents a gear retaining clamp member which is operatively interposed between the head portion of the bolt element 51 and the supporting structure 1.

It should be understood that it is not intended to limit the invention to the particular forms and details described hereinabove, and that the invention includes such other forms and modifications as are embraced by the scope of the appended claims.

It is claimed and desired to secure by Letters Patent:

1. A gear chuck comprising, in combination, a rotary gear supporting structure having radial chucking teeth and a circumferential portion presenting an axially extending bearing surface, an annular gear locking structure having radial chucking teeth and presenting an axially extending bearing surface in radial load transmitting engagement with and in axially and circumferentially shiftable relation to said bearing surface of said supporting structure, an eccentric mounted on one of said structures for rotary back and forth adjustment relative thereto on an axis spaced radially from and extending parallel to said axis of rotation of said supporting structure, torque transmitting abutments formed on and spaced from each other circumferentially of the other of said structures for cooperative engagement with said eccentric at diametrically opposite portions, respectively, of the latter, and adjustable clamping means operatively interposed between said supporting and locking structures and selectively operable to move said locking structure to different axially adjusted positions relative to said supporting structure.

2. A gear chuck as set forth in claim 1, in which said locking structure is rotatable back and forth between chuck loading and gear clamping positions by rotary back and forth movement of said eccentric on its axis, said chuck further comprising first and second torque transmitting stops formed, respectively, on said supporting and locking structures and engageable with and disengageable from each other by rotation of said locking structure from said gear clamping to said chuck loading position, and by rotation of said locking structure from said chuck loading to said gear clamping position, respectively.

3. A gear chuck as set forth in claim 1, and further comprising resilient means operatively interposed between said supporting and locking structures so as to yieldingly oppose axial movement of said locking structure toward said supporting structure.

4. A gear chuck as set forth in claim 1, and further comprising axial thrust transmitting abutment means formed on said supporting structure in axially engageable relation to said locking structure so as to limit axial movement of said locking structure in a direction away from said supporting structure.

5. A gear chuck comprising, in combination, a rotary gear supporting structure and a gear locking structure having chucking teeth, respectively, and being connected with each other for rotary back and forth adjustment of said locking structure relative to said supporting structure on the axis of rotation of said supporting structure between chuck loading and gear clamping positions, first and second torque transmitting stops formed, respectively, on said supporting and locking structures and engageable with and disengageable from each other by movement of said locking structure from said gear clamping to said chuck loading position, and by movement of said locking structure from said chuck loading toward said gear clamping position, respectively; and a manually operable actuating element rotatably mounted on one of said structures and operatively connected with the other so as to rotate said locking structure from said chuck loading into said gear clamping position by rotation of said actuating element on said one structure in one direction, and so as to rotate said locking structure from said gear clamping position into said chuck loading position by rotation of said actuating element on said one structure in the opposite direction.

6. A gear chuck as set forth in claim 5, in which a pin element, forming said first stop, is rigidly connected with said supporting structure and extends from the latter into an aperture formed in said locking structure, said aperture being enlarged radially of said pin element and having a wall portion affording said second stop.

7. A gear chuck as set forth in claim 6, in which said locking structure is arranged in confronting relation to one of the axially opposite ends of said supporting structure, and in which said pin element extends from said supporting structure in the axial direction of the latter into said aperture of said locking structure.

8. A gear chuck comprising, in combination, a rotary gear supporting structure having radial chucking teeth and a circumferential portion presenting an axially extending bearing surface, an annular gear locking structure having radial chucking teeth and presenting an axially extending bearing surface in radial load transmitting engagement with and in axially and circumferentially shiftable relation to said bearing surface of said supporting structure so as to support said locking structure for rotary back and forth adjustment between chuck loading and gear clamping positions relative to said supporting structure in radially centered and axially shiftable relation to the latter, first and second torque transmitting stops formed, respectively, on said supporting and locking structures and engageable with and disengageable from each other by rotation of said locking structure from said gear clamping to said chuck loading position, and by rotation of said locking structure from said chuck loading to said gear clamping position, respectively, and adjustable clamping means operatively interposed between said supporting and locking structures and selectively operable to move said locking structure to different axially adjusted positions relative to said supporting structure.

9. A gear chuck as set forth in claim 8, and further comprising resilient means operatively interposed between said supporting and locking structures so as to yieldingly oppose axial movement of said locking structure toward said supporting structure.

10. A gear chuck as set forth in claim 8, and further comprising axial thrust transmitting abutment means formed on said supporting structure in axially engageable relation to said locking structure so as to limit axial movement of said locking structure in a direction away from said supporting structure.

11. A gear chuck as set forth in claim 10, in which said locking structure has a circumferential series of axially extending bolt holes and in which a series of bolts forming said axial thrust transmitting abutment means extend, respectively, through said bolt holes and are mounted on said supporting structure in axially extending relation to the latter, said bolt holes being enlarged radially of the shanks of their respective bolts so as to permit rotary back and forth adjustment of said locking structure relative to said supporting structure.

12. A gear chuck comprising, in combination, a rotary gear supporting structure having radial chucking teeth, a radially extending end surface and an annular lip extending axially beyond said end surface, a gear locking structure rotatably supported on said lip in axially shiftable relation to said supporting structure and having chucking teeth in radially extending relation to the axis of rotation of said supporting structure, adjustable clamping means operatively interposed between said supporting and locking structures and selectively operable to apply and release an axial contracting pressure between said supporting and locking structures, said clamping means comprising a series of screw shanks mounted on said supporting structure and extending, respectively, through nonthreaded holes formed in said locking structure and enlarged radially of their respective screw shanks so as to permit rotary back and forth adjustment of said locking structure relative to said supporting structure, and resilient means operatively interposed between said supporting and locking structures so as to yieldingly oppose axial movement of said locking structure toward said supporting structure.

13. A gear chuck comprising, in combination, a rotary gear supporting structure having radial chucking teeth, releasable clamping means cooperable with said gear supporting structure for positioning a gear in concentric and axially fixed relation to said gear supporting structure and including a rotary gear locking structure having radial chucking teeth, means connecting said gear supporting and locking structures with each other for rotary back and forth adjustment of said locking structure relative to said supporting structure on the axis of rotation of said supporting structure between chuck loading and gear clamping positions, first and second torque transmitting stops formed, respectively, on said supporting and locking structures and engageable with and disengageable from each other by movement of said locking structure from said gear clamping to said chuck loading position, and by movement of said locking structure from said chuck loading toward said gear clamping position, respectively; and a manually operable eccentric rotatably mounted on said gear supporting structure on an axis radially spaced from and parallel to the axis of rotation of said gear supporting structure and operatively connected with said gear locking structure so as to rotate said locking structure from said chuck loading into said gear clamping position by rotation of said eccentric in one direction, and so as to rotate said locking structure from said gear clamping position into said chuck loading position by rotation of said eccentric in the opposite direction.

References Cited in the file of this patent

UNITED STATES PATENTS

| Number | Name | Date |
| --- | --- | --- |
| 190,043 | Hurd | Apr. 24, 1877 |
| 1,056,954 | Sponable | Mar. 25, 1913 |
| 1,110,396 | Marks | Sept. 15, 1914 |
| 1,882,871 | Page | Oct. 18, 1932 |
| 2,045,156 | Matchett | June 23, 1936 |
| 2,524,852 | Strauss | Oct. 10, 1950 |
| 2,555,496 | Mackmann | June 5, 1951 |